United States Patent

Raghu

(10) Patent No.: US 9,630,624 B2
(45) Date of Patent: Apr. 25, 2017

(54) METHOD TO ENHANCE SAFE ACCELERATION AND LEAD-VEHICLE DISTANCE KEEPING PERFORMANCE, BY MEASURING FORWARD VEHICLE GAPS

(71) Applicants: VOLKSWAGEN AG, Wolfsburg (DE); AUDI AG, Ingolstadt (DE)

(72) Inventor: Kaushik Raghu, Redwood City, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/859,933

(22) Filed: Sep. 21, 2015

(65) Prior Publication Data

US 2017/0080939 A1    Mar. 23, 2017

(51) Int. Cl.
*B60W 30/16* (2012.01)
*B60W 30/14* (2006.01)
*B60W 40/04* (2006.01)

(52) U.S. Cl.
CPC .......... *B60W 30/16* (2013.01); *B60W 30/143* (2013.01); *B60W 40/04* (2013.01); *B60W 2550/302* (2013.01); *B60W 2550/308* (2013.01); *B60W 2750/302* (2013.01); *B60W 2750/308* (2013.01)

(58) Field of Classification Search
CPC ..... B60W 30/16; B60W 30/143; B60W 40/04
USPC ....................... 701/96, 82, 301; 340/435, 903
See application file for complete search history.

(56) References Cited

U.S. PATENT DOCUMENTS

| 8,972,080 B2* | 3/2015 | Shida | G08G 1/0104 |
| | | | 701/117 |
| 2013/0124012 A1* | 5/2013 | Shida | G08G 1/0104 |
| | | | 701/2 |
| 2015/0232093 A1* | 8/2015 | Fairgrieve | B60W 30/143 |
| | | | 701/90 |

OTHER PUBLICATIONS

A Car That Predicts Danger—How to Avert Crises in Heavy Traffic—Nissan Murano; downloaded from http://www.popsci.com/article/cars/car-predicts-danger; Jul. 2, 2014.
Cooperative Adaptive Cruise Control: Human Factors Analysis; U.S. Department of Transportation Federal Highway Administration; Publication No. FHWA/HRT-13-045; Oct. 2013.
Schakel et al.; Effects of Cooperative Adaptive Cruise Control on Traffic Flow; Intelligent Transportation Systems (ITSC); 2010 13th International IEEE Conference; Sep. 9-22, 2010; pp. 759-764.

* cited by examiner

*Primary Examiner* — Marthe Marc-Coleman
(74) *Attorney, Agent, or Firm* — Barnes & Thornburg LLP

(57) ABSTRACT

An adaptive cruise control that adjusts the speed of the controlled vehicle based on one or more vehicles ahead of the controlled vehicle. The adaptive cruise control illustratively includes a forward vehicles sensor that monitors not only the lead vehicle directly ahead of the controlled vehicle, but also one or more forward vehicles. The data from the forward vehicles sensor can be used to adjust the controlled vehicle speed.

20 Claims, 2 Drawing Sheets

METHOD TO ENHANCE SAFE ACCELERATION AND LEAD-VEHICLE DISTANCE KEEPING PERFORMANCE, BY MEASURING FORWARD VEHICLE GAPS

BACKGROUND

The present disclosure relates to an adaptive cruise control for use in a passenger vehicle. In particular, the present disclosure is directed to an adaptive cruise control that adjusts vehicle speed based on a prediction of when a lead vehicle will accelerate and/or decelerate.

SUMMARY

According to the present disclosure, an adaptive cruise control is provided that adjusts the speed of the controlled vehicle based on one or more vehicles ahead of the controlled vehicle. The adaptive cruise control illustratively includes a mode in which the controlled vehicle can more closely follow a lead vehicle in certain traffic situations, such as during congested traffic. This mode allows the adaptive cruise control to start acceleration more quickly without negatively impacting safety.

In illustrative embodiments, the adaptive cruise control includes a forward vehicles sensor that monitors not only the lead vehicle directly ahead of the controlled vehicle, but also one or more forward vehicles. The data from the forward vehicles sensor can be used by a speed prediction unit to predict acceleration and/or deceleration of the lead vehicle directly in front of the controlled vehicle. This prediction can be used to adjust vehicle speed without maintaining a predetermined minimum distance to the controlled vehicle. For example, the prediction could be based on the speed and/or gaps between the lead vehicle and one or more forward vehicles.

In illustrative embodiments, the adaptive cruise control can switch between operating modes depending on traffic conditions. In one mode, the adaptive cruise control maintains a predetermined distance behind the lead vehicle while in a second mode the speed of the controlled vehicle is adjusted based on a prediction of when the lead vehicle will accelerate and/or decelerate. In the second mode, the control vehicle may start acceleration sooner than in the first mode to follow the lead vehicle more closely than the predetermined distance that is maintained in the first mode.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
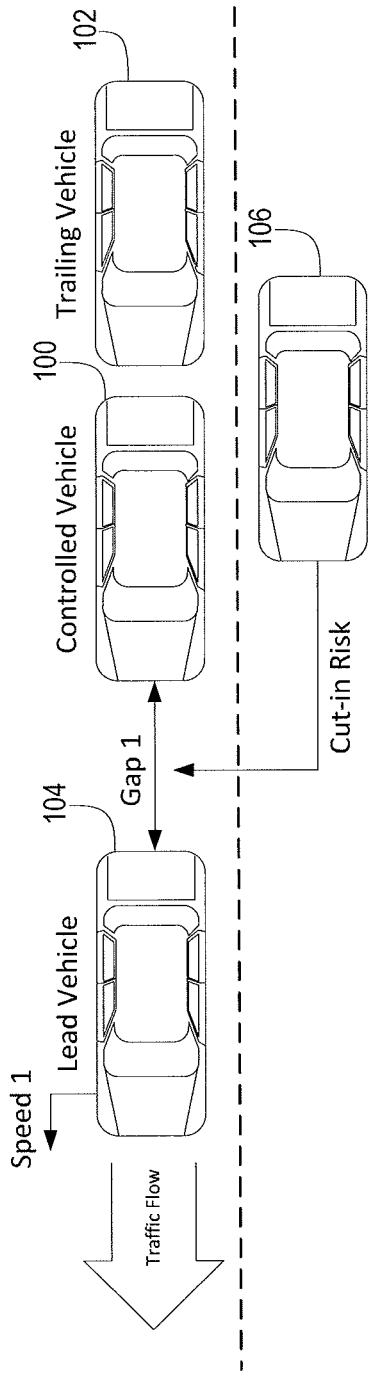
FIG. 1 is a diagrammatic view showing use of a prior art adaptive cruise control in an example traffic pattern.

FIG. 1 illustrates potential problems with existing adaptive cruise control systems in certain traffic patterns, which includes but is not limited to heavy traffic patterns (e.g., a traffic jam situation, freeway rush hour traffic, etc.) at which there is stop-and-go traffic involving frequent acceleration and deceleration and at traffic signals. In the example traffic pattern shown, there is a controlled vehicle 100 that includes an existing adaptive cruise control system. There are two other vehicles in the same lane as the controlled vehicle 100 in this example. A trailing vehicle 102 is in the same lane behind the controlled vehicle 100 while a lead vehicle 104 is in the same lane directly ahead of the controlled vehicle 100. The lead vehicle 104 accelerates and decelerates based on the traffic flow ahead of it. An adjacent vehicle 106 is in a lane beside the controlled vehicle 100.

Existing adaptive cruise controls operate by monitoring a gap between the controlled vehicle 100 and the lead vehicle 104, which is identified in this example by "Gap 1," and the speed of the lead vehicle 104. When the lead vehicle 104 starts to move, existing adaptive cruise control systems will not immediately start acceleration of the controlled vehicle 100 until the lead vehicle's 104 speed exceeds a predetermined value or until Gap 1 exceeds a predetermined distance. Once the gap between the controlled vehicle 100 and the lead vehicle 104 exceeds the predetermined distance or speed, existing adaptive cruise control systems will then start to accelerate the controlled vehicle 100. However, certain traffic conditions, such as in bumper-to-bumper traffic, where the lead vehicle's speed does not exceed the predetermined value, creates a delay in starting acceleration of the controlled vehicle 100 that can be frustrating for drivers because the adaptive cruise control system is not acting like a human driver and is perceived as lethargic or slow to react. Moreover, this can be frustrating for drivers of other vehicles, such as the trailing vehicle 102, because the delayed acceleration further congests traffic and causes aggravation. Additionally, the gap created between the controlled vehicle 100 and the lead vehicle 104 potentially encourages drivers in adjacent lanes, such as vehicle 106, to cut in very close to the controlled vehicle 100, which increases the potential of an accident.

Figure 2:
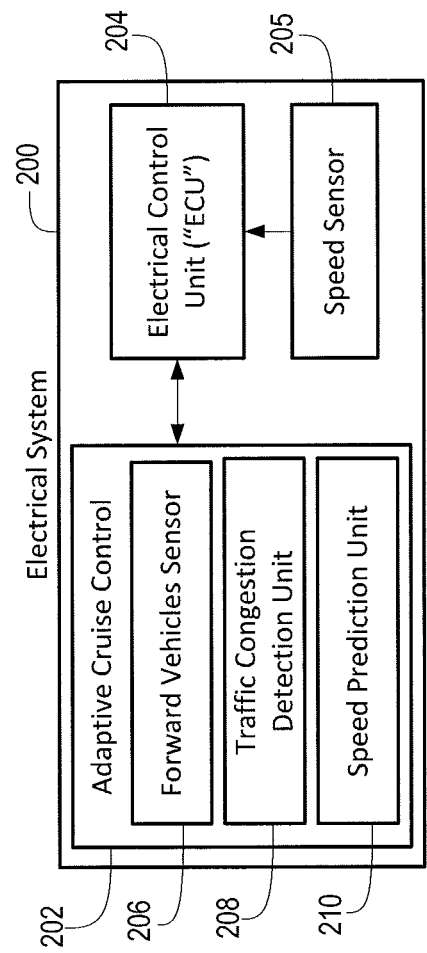
FIG. 2 is a block diagram showing example components of the vehicle speed control device according to an embodiment of the disclosure.

FIG. 2 is a block diagram showing an electrical system 200 of a vehicle with a vehicle speed control system or adaptive cruise control 202 according to an embodiment of the present disclosure. In some embodiments, the adaptive cruise control 202 adjusts the speed of a controlled vehicle based on monitoring a lead vehicle and one or more forward vehicles ahead of the lead vehicle to predict acceleration and deceleration of the lead vehicle. As explained below, the adaptive cruise control 202 allows for earlier acceleration of a controlled vehicle instead of waiting until a predetermined distance to the lead vehicle is reached. In the embodiment shown, the adaptive cruise control 202 is in electrical communication with an electrical control unit ("ECU") 204. The adaptive cruise control 202 communicates with the ECU to control the speed of a controlled vehicle. In the example shown, a speed sensor 205 is also in electrical communication with the ECU to provide a real-time speed of the controlled vehicle.

In the example shown, the adaptive cruise control 202 includes a forward vehicles sensor 206, a traffic congestion detection unit 208, and a speed prediction unit 210. The forward vehicles sensor 206 monitors the speed and/or gaps between the lead vehicle and one or more forward vehicles ahead of the lead vehicle. For example, the forward vehicles sensor 206 could use radar technology or other sensors to detect not only the lead vehicle, but could also detect one or more vehicles ahead of the lead vehicle. Accordingly, in some embodiments, the forward vehicles sensor 206 could monitor the distance between the lead vehicle and the forward vehicle immediately ahead of the lead vehicle and/or the speed of the forward vehicle. Likewise, in some embodiments, the forward vehicles sensor 206 could detect the distance between one or more forward vehicles and/or the speed of those forward vehicles. Although the forward vehicles sensor 206, traffic congestion detection unit 208, and speed prediction unit 210 are shown as separate units in FIG. 2 for purposes of example, one or more of these units could be combined. For example, the forward vehicles sensor 206 and traffic congestion detection unit 208 are shown separately for purposes of illustration, but could use the same sensor(s). Conversely, there is only one of these units shown for purposes of example, but there could be multiple units. For example, there could be multiple sensors included in the forward vehicles sensor 206 and/or the traffic congestion detection unit 208.

The adaptive cruise control 202 includes a traffic congestion detection unit 208 in the embodiment shown. In some embodiments, the adaptive cruise control 202 may switch between different modes depending on the traffic conditions encountered by the controlled vehicle. For example, the adaptive cruise control 202 could operate under a first mode in which the controlled vehicle is prevented from getting closer to the lead vehicle than a predetermined distance and a second mode in which the controlled vehicle can follow the lead vehicle more closely than the predetermined distance. The adaptive cruise control 202 could operate in the first mode, for example, when the controlled vehicle is traveling at a speed above a threshold speed. However, in slower speeds, such as during bumper-to-bumper traffic, the adaptive cruise control 202 could enter the second mode where the controlled vehicle can follow the lead vehicle more closely without negatively impacting safety. The traffic congestion detection unit 208 could detect the traffic pattern, such as whether traffic is freely flowing, congested, or at a traffic signal. For example, the traffic pattern could be determined based on the controlled vehicle's speed, the speed of the lead vehicle and/or forward vehicles and/or gaps between the controlled vehicle, lead vehicle and/or forward vehicles.

The adaptive cruise control 202 illustratively includes a speed prediction unit 210 to predict acceleration and/or deceleration of the lead vehicle based on data detected by the forward vehicles sensor 206. One skilled in the art should appreciate that multiple conditions of the lead vehicle and forward vehicles could be used in predicting the acceleration and/or deceleration of the lead vehicle. By way of example only, the speed prediction unit 210 could predict acceleration based on an increase in the gap between the lead vehicle and one or more forward vehicles; conversely, the speed prediction unit could predict deceleration of the lead vehicle based on a decrease in the gap between the lead vehicle and one or more forward vehicles. If the gap between the lead vehicle and one or more forward vehicles starts to increase, for example, the adaptive cruise control 202 could immediately start acceleration of the controlled vehicle based on the speed prediction unit 210 predicting acceleration of the lead vehicle. By way of another example, the speed prediction unit 210 could predict acceleration and/or deceleration based on a change in speed of the lead vehicle and one or more forward vehicles; for example, the speed prediction unit could predict acceleration based on an increase in speed of the lead vehicle and/or one or more forward vehicles, which could allow the adaptive cruise control 202 to start acceleration of the controlled vehicle.

Figure 3:
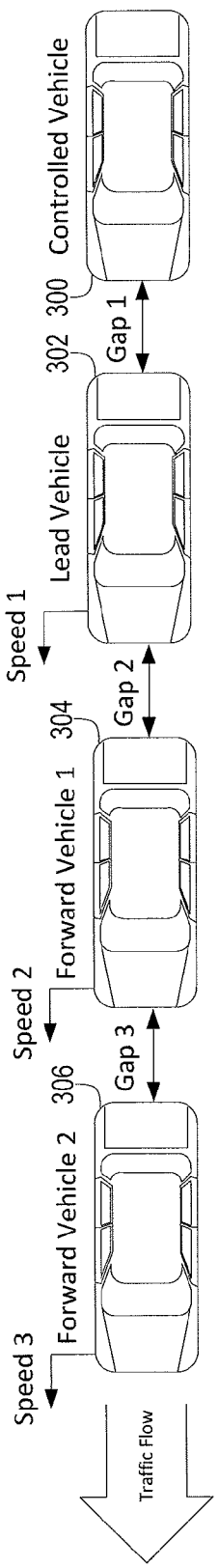
FIG. 3 is a diagrammatic view of an example traffic pattern showing use of an vehicle speed control device according to an embodiment of the disclosure.

FIG. 3 illustrates the operation adaptive cruise control 202 according to an embodiment of the present disclosure in a traffic pattern similar to that shown in FIG. 1. In the example shown, a controlled vehicle 300 includes adaptive cruise control 202 according to an embodiment of the present disclosure and is therefore able to accelerate sooner than existing adaptive cruise controls so that acceleration can occur before the distance to the directly ahead of the controlled vehicle 100 exceeds a predetermined threshold distance.

In the example shown, the controlled vehicle 300 is in the same lane as a lead vehicle 302 that is directly ahead of the controlled vehicle 300. A first forward vehicle 304 is in the same lane directly ahead of the lead vehicle 302 and a second forward vehicle 306 is in the same lane directly ahead of the first forward vehicle 304. The speed of the second forward vehicle 306 depends, at least in part, on the traffic conditions ahead of the second forward vehicle 306. The actions of the second forward vehicle 306 impact the actions of the first forward vehicle 304. The first forward vehicle 304 will accelerate and decelerate, at least in part, based on the acceleration and deceleration of the second forward vehicle 306. In a similar manner, the lead vehicle 302 will accelerate and decelerate based on the speed of the first forward vehicle 304.

Figure 4:
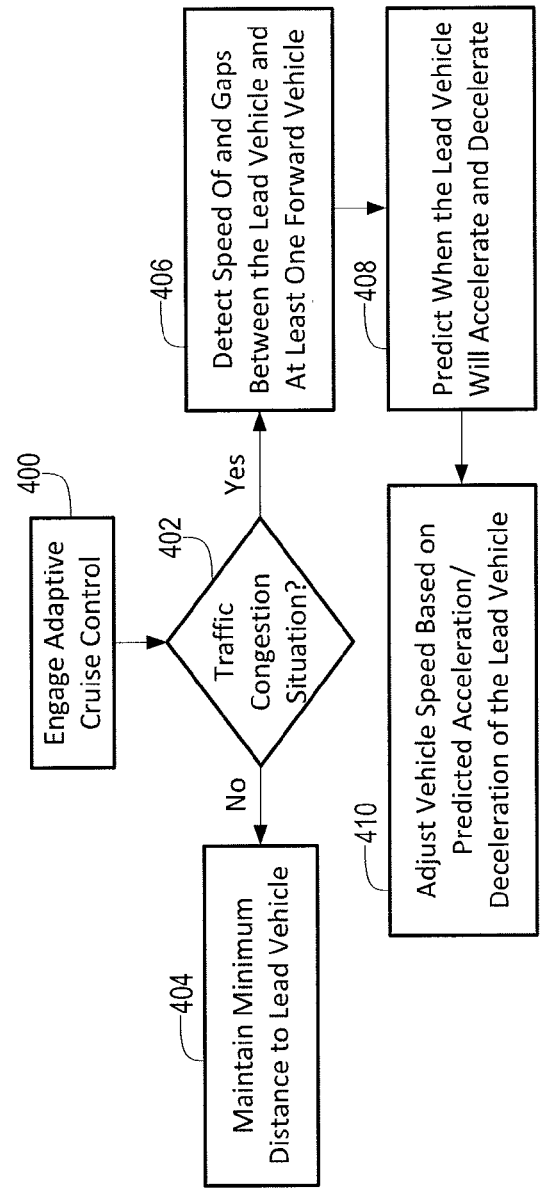
FIG. 4 is a flowchart showing example operation of the vehicle speed control device according to an embodiment of the disclosure.

Referring now also to FIG. 4, the driver of the controlled vehicle 300 will engage the adaptive cruise control (Block 400). As discussed above, the adaptive cruise control 202 could be configured with different modes depending on the traffic conditions. The traffic congestion detection unit 208 is used by the adaptive cruise control 202 to determine which mode of operation should be used (Block 402). If the traffic congestion detection unit 208 determines that traffic is flowing relatively freely, a mode of operation is engaged in which the controlled vehicle 300 maintains a minimum distance to the lead vehicle (Block 402). If the traffic congestion detection unit 208 determines that this is a traffic jam situation, the adaptive cruise control 200 enters a mode of operation in which the speed of controlled vehicle 300 will be based on a prediction of when the lead vehicle 302 will accelerate and/or decelerate, such as by detecting the speed of the gaps between the lead vehicle 302 and one or more forward vehicles 304, 306 (Blocks 406, 408). Based on the prediction, the speed of the controlled vehicle 300 can be adjusted (Block 410).

Consider an example in which the vehicles 300, 302, 304, 306 are all stopped (or moving slowly) in a traffic jam situation. The situation could be detected by the traffic congestion detection unit 208, which could enter the adaptive cruise control 202 into a mode in which the speed of the controlled vehicle 300 is adjusted based on predicted acceleration/deceleration of the lead vehicle 302 rather than maintaining a preset minimum distance to the lead vehicle 302. This would allow the controlled vehicle 300 to more closely follow the lead vehicle 302, which would more closely mimic the actions of a human driver. Due to the traffic pattern (e.g., heavy congestion), the vehicles 300, 302, 304, 306 would be operating at low speeds with correspondingly low braking distances, which would mean that the closer following distance would not negatively impact safety. However, the fact that the controlled vehicle 300 would start acceleration sooner than existing adaptive cruise controls should reduce frustration of the driver and minimize the risk of accident from an adjacent vehicle cutting in closely to the controlled vehicle.

If the traffic ahead of the second forward vehicle 306 starts to move, the second forward vehicle 306 would likewise start to move. The increase speed of the second forward vehicle 306 and gap between the first forward vehicle 304 and second forward vehicle 306 could be detected by the forward vehicles sensor 206. The first forward vehicle 304 could then start to move which will increase the gap between the lead vehicle 302 and the first forward vehicle 304, which could be detected by the forward vehicles sensor 206. Accordingly, the forward vehicle sensor 206 in the controlled vehicle 300 would detect the movement of not only the lead vehicle 302, but also the movement of the first forward vehicle 304 and/or the second forward vehicle 306. The movement of the first forward vehicle 304 and the second forward vehicle 306 could be used by the speed prediction unit 210 to predict movement of the lead vehicle 302. Once traffic congestion detection unit 208 determines that the traffic jam situation has ended, this mode of the adaptive cruise control 202 will cease and the predetermined distance to the lead vehicle 302 will be maintained. For example, when the speed of the controlled vehicle exceeds a predetermined speed, the adaptive cruise control 202 will switch to a mode in which a minimum distance to the lead vehicle 302 is maintained.

The use of technology in passenger vehicles continues to grow, including the use of adaptive cruise controls to adjust the speed of vehicles. While drivers enjoy the use of adaptive cruise controls in many circumstances, there are certain traffic situations, such as stop and go traffic, for which existing adaptive cruise controls can be frustrating due to the perceived lag in acceleration. The use of adaptive cruise controls in this type of traffic situation presents a technical problem.

Embodiments of the present disclosure provide a solution to the technical problem to lag in acceleration while using adaptive cruise controls. Accordingly, the present disclosure provides an operating mode for the adaptive cruise control that adjusts the speed of the controlled vehicle based on predictions of when the lead vehicle will accelerate and/or decelerate.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A vehicle speed control device in a vehicle, the device comprising:
   an electronic control unit ("ECU");
   a forward vehicles sensor, in electronic communication with the ECU, to generate a forward vehicles signal that indicates one or more of a distance to and speed of a lead vehicle, a distance between the lead vehicle and a forward vehicle traveling ahead of the lead vehicle, the lead vehicle and the forward vehicle traveling in substantially a same lane, and a speed of the forward vehicle;
   a speed sensor, in electronic communication with the ECU, to sense a controlled vehicle speed of the vehicle;
   a traffic congestion detection unit, in electronic communication with the ECU, to monitor when the controlled vehicle speed is below a predetermined vehicle speed; and
   control means, in electronic communication with the ECU for adjusting the controlled vehicle speed based on a predicted acceleration and/or deceleration of the lead vehicle determined based on the forward vehicles signal when the controlled vehicle speed is below the predetermined vehicle speed so that acceleration occurs without regard to the distance to the lead vehicle.

2. The vehicle speed control device of claim 1, wherein the acceleration and deceleration of the lead vehicle is predicted based on the speed of the forward vehicle.

3. The vehicle speed control device of claim 2, wherein the acceleration and deceleration of the lead vehicle is predicted based on the gap between the lead vehicle and the forward vehicle.

4. The vehicle speed control device of claim 1, wherein the forward vehicles signal further indicates one or more of a distance to and speed of a lead vehicle, a distance between the lead vehicle and a first forward vehicle traveling ahead of the lead vehicle, a distance between the first forward vehicle and a second forward vehicle traveling ahead of the first forward vehicle, the lead vehicle, the first forward vehicle, and the second forward vehicle traveling in substantially a same lane, a speed of the first forward vehicle, and a speed of the second forward vehicle.

5. The vehicle speed control device of claim 4, wherein the control means adjusts the controlled vehicle speed based on predicted acceleration and deceleration of the lead vehicle determined based on the speed of the first forward vehicle while the traffic congestion detection unit detects the controlled vehicle speed is below the predetermined vehicle speed.

6. The vehicle speed control device of claim 5, wherein the control means adjusts the controlled vehicle speed based on predicted acceleration and deceleration of the lead vehicle determined based on the speed of the second forward vehicle while the traffic congestion detection unit detects the controlled vehicle speed is below the predetermined vehicle speed.

7. The vehicle speed control device of claim 6, wherein the control means adjusts the controlled vehicle speed based on predicted acceleration and deceleration of the lead vehicle determined based on the distance between the lead vehicle and the first forward vehicle while the traffic congestion detection unit detects the controlled vehicle speed is below the predetermined vehicle speed.

8. The vehicle speed control device of claim 7, wherein the control means adjusts the controlled vehicle speed based on predicted acceleration and deceleration of the lead vehicle determined based on the distance between the first forward vehicle and the second forward vehicle while the traffic congestion detection unit detects the controlled vehicle speed is below the predetermined vehicle speed.

9. A passenger vehicle comprising:
an electrical system with a speed sensor to sense a controlled vehicle speed and an adaptive cruise control to control the controlled vehicle speed;
the adaptive cruise control including a forward vehicles sensor to generate a forward vehicles signal that indicates one or more of a distance to and speed of a lead vehicle, a distance between the lead vehicle and a forward vehicle traveling ahead of the lead vehicle, wherein the lead vehicle and the forward vehicle traveling in substantially a same lane, and a speed of the forward vehicle; and
a traffic congestion detection unit to monitor when the controlled vehicle speed is below a predetermined vehicle speed, and
wherein the adaptive cruise control device includes a first mode when the controlled vehicle speed is above the predetermined vehicle speed and a second mode when the controlled vehicle speed is below the predetermined vehicle speed,
wherein, in the first mode, the adaptive cruise control is configured to adjust the controlled vehicle speed by maintaining at least a minimum distance to the lead vehicle, and
wherein, in the second mode, the adaptive cruise control is configured to adjust the controlled vehicle speed based on predicted acceleration and deceleration of the lead vehicle determined based on the forward vehicles signal so that acceleration can occur before the distance to the lead vehicle reaches the minimum distance.

10. The passenger vehicle of claim 9, wherein, in the second mode, the adaptive cruise control predicts acceleration and deceleration of the lead vehicle based on the speed of the forward vehicle.

11. The passenger vehicle of claim 10, wherein, in the second mode, the adaptive cruise control predicts acceleration and deceleration of the lead vehicle based on the gap between the lead vehicle and the forward vehicle.

12. The passenger vehicle of claim 9, wherein the forward vehicles signal further indicates one or more of a distance to and speed of a lead vehicle, a distance between the lead vehicle and a first forward vehicle traveling ahead of the lead vehicle, a distance between the first forward vehicle and a second forward vehicle traveling ahead of the first forward vehicle, the lead vehicle, the first forward vehicle, and the second forward vehicle traveling in substantially a same lane, a speed of the first forward vehicle, and a speed of the second forward vehicle.

13. The passenger vehicle of claim 12, wherein, in the second mode, the adaptive cruise control adjusts the controlled vehicle speed based on predicted acceleration and deceleration of the lead vehicle determined based on the speed of the first forward vehicle.

14. The passenger vehicle of claim 13, wherein, in the second mode, the adaptive cruise control adjusts the controlled vehicle speed based on predicted acceleration and deceleration of the lead vehicle determined based on the speed of the second forward vehicle.

15. The passenger vehicle of claim 14, wherein, in the second mode, the adaptive cruise control adjusts the controlled vehicle speed based on predicted acceleration and deceleration of the lead vehicle determined based on the distance between the lead vehicle and the first forward vehicle.

16. The passenger vehicle of claim 15, wherein the adaptive cruise control adjusts the controlled vehicle speed based on predicted acceleration and deceleration of the lead vehicle determined based on the distance between the first forward vehicle and the second forward vehicle.

17. A method of controlling speed of a passenger vehicle, the method comprising:
detecting using one or more sensors a speed of and gaps between a lead vehicle and at least one forward vehicle traveling ahead of the lead vehicle, the lead vehicle and the forward vehicle traveling in substantially a same lane;
predicting when the lead vehicle will accelerate and decelerate based on one or one more of a speed of the forward vehicle and a gap between the forward vehicle and the lead vehicle;
monitoring when a controlled vehicle speed is below a predetermined vehicle speed; and
when the controlled vehicle speed is below the predetermined vehicle speed, adjusting the controlled vehicle speed based on the predicted acceleration and deceleration.

18. The method of claim 17, wherein the prediction of when the lead vehicle will accelerate and decelerate is based on a speed of the forward vehicle sensed by the one or more sensors.

19. The method of claim 18, wherein the prediction of when the lead vehicle will accelerate and decelerate is based on a gap between the forward vehicle and the lead vehicle determined based on the one or more sensors.

20. The method of claim 19, wherein the prediction of when the lead vehicle will accelerate and decelerate is based on a speed of the lead vehicle determined based on the one or more sensors.

* * * * *